United States Patent Office 2,852,563
Patented Sept. 16, 1958

2,852,563

CONDENSATION OF ISOALDEHYDES WITH LOWER ALIPHATIC ALDEHYDES

Hugh J. Hagemeyer, Jr., and Glenn V. Hudson, Longview, Tex., assignors to Eastman Kodak Company, Rochester, N. Y., a corporation of New Jersey No Drawing. Application October 17, 1955
Serial No. 541,052

8 Claims. (Cl. 260—601)

This is a continuation-in-part of applicants' copending application Serial No. 468,586, filed November 12, 1954. This invention is concerned with a new and novel process for the production of unsaturated aldehydes by the reaction of isoaldehydes with lower aliphatic aldehydes. It is particularly concerned with a process wherein an aliphatic aldehyde containing only one available hydrogen on the alpha carbon is condensed with a lower aliphatic aldehyde containing two available hydrogen atoms on the alpha carbon atom to form an unsaturated aldehyde. It is concerned with a process wherein an isoaldehyde and a lower aliphatic aldehyde are reacted in the presence of an alkaline catalyst under particular conditions as regards pressure and temperature. It is specifically concerned with a process for the production of unsaturated aldehydes by reacting isobutyraldehyde and 2-methylbutyraldehyde with lower aliphatic aldehydes at temperatures from 60–150° C. in the presence of strongly alkaline catalysts. The invention is further concerned with a process wherein the lower aliphatic aldehyde is reacted in the presence of an excess of the isoaldehyde and an alkaline catalyst at a temperature in the range of 60–150° C. It is further specifically concerned with a process for the production of 2-ethyl-4-methylpentenal, 2-propyl-4-methylpentenal, 2-isopropyl-4-methylpentenal, 2,4-dimethylhexenal, 2-ethyl-4-methylhexenal, 2-isopropyl-4-methylhexenal and 2-propyl-4-methylhexenal.

This invention is further concerned with the condensation of the mixed aldehyde stream produced by the oxonation of butenes to produce 10-carbon enals. The oxonation of butene streams comprised of butenes-1 and 2 and isobutylene results in the formation of a mixture of n-valeraldehyde, 2-methylbutyraldehyde and 3-methylbutyraldehyde. This invention is concerned with a new and novel process whereby all three of these valeraldehydes are condensed and converted to 10-carbon enals. The particular novelty resides in the condensation of 2-methylbutyraldehyde with n-valeraldehyde and 3-methylbutyraldehyde to form unsaturated enals.

The invention is further concerned with the new compositions of matter produced by the hydrogenation of the corresponding enals to the corresponding anals. These new compositions of matter include 2-ethyl-4-methylpentanal, 2-propyl-4-methylpentanal, 2-isopropyl-4-methylpentanal, 2,4-dimethylhexanal, 2-ethyl-4-methylhexanal, 2-isopropyl-4-methylhexanal, and 2-propyl-4-methylhexanal.

The invention is also concerned with the preparation of the new compositions of matter produced by the complete hydrogenation of the enals to produce the corresponding anols. The new and valuable alcohols produced by the process of the present invention include 2-ethyl-4-methylpentanol, 2-propyl-4-methylpentanol, 2-isopropyl-4-methylpentanol, 2,4-dimethylhexanol, 2-ethyl-4-methylhexanol, 2-isopropyl-4-methylhexanol, and 2-propyl-4-methylhexanol.

The invention is still further concerned with the preparation of new and valuable vinyl and cellulosic plasticizers by the reaction of these new alcohols with suitable dibasic acids to form the corresponding succinates, adipates, sebacates, azelates, and phthalates.

Lieben, Monat für Chemie, 22, 291–298 (1901) states that the rule for aldehyde addition is that the aldehyde group adds to a CH group easier than to a $CH_2$ group and to a $CH_2$ group easier than to a $CH_3$ group. Thus it would be expected that the addition of an aliphatic aldehyde would take place at the alpha carbon of the isoaldehyde. We have now discovered conditions whereby the addition takes place at the $CH_2$ group rather than the CH group. Kohn, Monat für Chemie, 22, 23–24 (1901) has claimed the formation of a trace of a mixed aldol wherein isobutyraldehyde adds to propionaldehyde. Kohn states that the crude product is nondistillable and is comprised mainly of isobutyraldol and propionaldol. The article further states that the separation of these aldols is done only with great difficulty. We have a substantially improved process. The formation of isobutyraldol is eliminated by operating at reflux temperatures and using a strong alkaline catalyst rather than potassium carbonate. The formation of propionaldol is also substantially reduced by employing excess isoaldehyde which causes the aliphatic aldehyde to react immediately as added.

The process of the present invention makes use of the discovery that easily dehydratable aldols of isoaldehydes (2-methylbutyraldehyde and isobutyraldehyde) and lower aliphatic aldehydes are prepared by adding the isoaldehyde to the alpha carbon of the lower aliphatic aldehyde. This is accomplished by operating under particular conditions of temperature and at normal or increased pressures. It is further based upon the discovery that the alternate aldol condensation products wherein the lower aliphatic aldehyde adds to the alpha carbon of the isoaldehyde revert to the original monomeric aldehydes in the presence of a strong alkaline catalyst at temperatures of 50–150° C. and at normal or increased pressures.

In Equations 1 through 4 the four possible aldol products from the homo and hetero condensations of isoaldehydes and lower aliphatic aldehydes are shown.

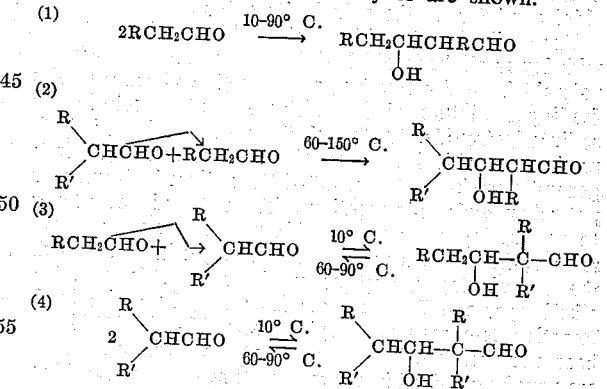

R is hydrogen, alkyl, or aryl; R' is usually methyl but can also be higher alkyl residues.

In an earlier application of one of the applicants, Serial No. 439,865, filed June 28, 1954, now U. S. Patent No. 2,811,562, it has been shown that the aldol product 3 is formed to the exclusion of all others by carrying out the condensation at temperatures from 60–90° C. in the presence of an alkali metal carbonate catalyst. The complete suppression of any of the aldol product 1 was accomplished by operating in the presence of excess isoaldehyde. In the presence of strongly alkaline catalyst such as sodium and potassium hydroxide and sodium and potassium cyanide and operating at temperatures in the range of 0–40° C., all of the aldol products 1 through 4 can be formed.

We have now discovered that by operating under strongly alkaline conditions and at temperatures in excess of 60° C. that only the easily dehydrated aldol products 1 and 2 are formed. As mentioned above, operating in the presence of excess isoaldehyde the formation of aldol product 1 can be practically completely suppressed. By operating at the elevated temperatures employed in carrying out the aldol condensation of isoaldehyde with lower aliphatic aldehydes, the product formed is the unsaturated enal resulting from the dehydration of the primary aldol product.

(5)
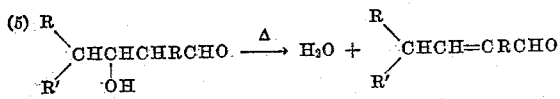

The process of the present invention has been applied to the reaction of isobutyraldehyde with n-butyraldehyde to form 2-ethyl-4-methylpentenal, isobutyraldehyde with n-valeraldehyde to form 2-propyl-4-methylpentenal and isobutyraldehyde with 3-methylbutyraldehyde to form 2-isopropyl-4-methylpentenal. In a similar fashion isovaleraldehyde (2-methylbutyraldehyde) has been condensed with propionaldehyde to form 2,4-dimethylhexenal, with n-butyraldehyde to form 2-ethyl-4-methylhexenal, with 3-methylbutyraldehyde to form 2-isopropyl-4-methylhexenal and with n-valeraldehyde to form 2-propyl-4-methylhexenal.

Although it is possible to carry out the condensation of isoaldehydes with lower aliphatic aldehydes containing from 2 to 6 carbon atoms, the preferred condensations are those involving two particular isoaldehydes, namely isobutyraldehyde and 2-methylbutyraldehyde, with three, four and five-carbon aldehydes. In this preferred range the highest conversions and yields to the dehydratable mixed aldol product (Equation 2) are realized. Thus the homocondensation reactivity of the acetaldehyde is so much greater than its hetero condensation reactivity that the principal product, where the isoaldehyde is reacted with acetaldehyde under the conditions of the present invention, is crotonaldehyde. In contrast the condensations carried out in accordance with the present invention between isoaldehydes and 4 and 5-carbon adiphatic aldehydes result in the formation of easily dehydratable mixed aldol products as the principal product.

The easily dehydratable aldol products of isoaldehydes with lower aliphatic aldehydes such as butyraldehyde, n-valeraldehyde, 3-methylbutyraldehyde have been made by feeding a mixture of the aldehyde to a hot solution of sodium hydroxide. Although the concentration of alkali used is not critical, a strong alkali is necessary, and it is generally preferred to use a 2–10% sodium hydroxide or potassium hydroxide solution. The ratio of water layer to organic layer can vary within wide limits in the aldol reactor, that is, as much as 95% alkali layer in contact with the organic layer may be used or as little as 30% alkali layer and 70% organic layer may be maintained. Reaction temperatures varying from 50–150° C. have been used and we have found that the optimum results are usually obtained in the temperature range of 90–110° C. At temperatures below this preferred range, the formation of the aldol product resulting from the homocondensation of the lower aliphatic aldehyde with itself is formed in increasing amounts and at temperatures above 110° C. there is considerable yield loss due to the formation of Tischenko products and the Cannizzaro reaction. The ratio of isoaldehyde to lower aliphatic aldehyde may vary from as little as 1/1 to 100/1. Pressures employed may vary from atmospheric to those pressures required to maintain the desired excess of isoaldehyde in the aldol reactor at the elevated temperatures employed for the condensation reaction.

By operating in the preferred temperature range and using strongly alkaline catalyst solutions, none of the aldol products representing the addition of a lower aliphatic aldehyde to the alpha carbon of the isoaldehyde (Reaction 3 above) are formed. Thus the only by-product to be reckoned with is the homocondensation product of the lower aliphatic aldehyde and this is minimized or eliminated by a proper selection of the excess of isoaldehyde employed, contact time and temperature, in accordance with the present invention.

The invention is further illustrated by the following specific examples.

EXAMPLE 1

*2-methylbutyraldehyde plus n-valeraldehyde*

Seventeen hundred twenty grams of isovaleraldehyde (2-methylbutyraldehyde) and 860 g. of n-valeraldehyde were mixed and fed to the suction side of a pump which was cycling a 5% solution of sodium hydroxide at 96° C. The aldehyde mixture was fed in over a three-hour period and the unreacted valeraldehydes were distilled out, condensed and recycled to the reactor. An organic-water ratio in the reaction system of 70–30 was maintained and the reactor was overflowed to a decanter, the organic layer decanted continuously and the water layer returned to the reactor.

The total reaction time required was 5.2 hours. The crude aldol product was steam distilled from 2% caustic and the steam distillate was dried and distilled. The unreacted valeraldehydes were stripped off. The crude enal product was distilled on a 100-plate column at 16 to 1 reflux. Ninety-six percent of the normal valeraldehyde was reacted and 75% was converted to 2-propyl-4-methylhexenal

[CH$_3$CH$_2$CH(CH$_3$)CH=C(C$_3$H$_7$)CHO]

with the yield based on isovaleraldehyde of 94%. 2-propyl-4-methylhexenal boils at 200° C.,

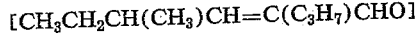

This is a new composition of matter.

EXAMPLE 2

*2-methyl butyraldehyde plus 3-methyl butyraldehyde*

Operating as in Example 1, 1720 g. of 2-methylbutyraldehyde and 860 g. of 3-methylbutyraldehyde were mixed and fed to the suction side of circulatory pump. The aldehyde mixture was fed in over a 4-hour period and the total reaction time was 2.5 hours. The crude aldol product was steam distilled from 5% sodium hydroxide and the steam distillate was stripped of unreacted valeraldehydes. The crude enal product was dried and distilled on a 100-plate column at 16 to 1 reflux. An 86% conversion of the 3-methylbutyraldehyde to 2-isopropyl-4-methylhexanal

[CH$_3$CH$_2$CH(CH$_3$)CH=C(isopropyl)CHO]

was obtained and the yield based on 2-methylisobutyraldehyde was 96%. 2-isopropyl-4-methylhexenal boils at 192° C. This is a new composition of matter.

EXAMPLE 3

*2-methyl butyraldehyde plus n-butyraldehyde*

Seventeen-hundred twenty grams of 2-methylbutyraldehyde and 720 g. of n-butyraldehyde were mixed and fed to the suction side of a circulatory pump which was cycling a 2% solution of sodium hydroxide at 93–95° C. The aldehyde mixture was fed in over a four-hour period and the unreacted aldehydes were condensed and recycled to the reactor. The total reaction time was 3 hours. The crude product decanted from the caustic solution was steam distilled from 2% sodium hydroxide solution and the unreacted aldehydes were stripped off from the steam distillate. The crude enal product was dried and distilled on a 100-plate column at 16-to-1 reflux. A 72% conversion of n-butyraldehyde to 2-ethyl-4-methylhexanal

[CH$_3$CH$_2$CH(CH$_3$)CH=C(C$_2$H$_5$)CHO]

was realized and the yield based on n-butyraldehyde was

62%. A 34% yield of n-butyraldehyde to 2-ethylhexenal was also realized. 2-ethyl-4-methylhexenal boils at 187° C., $$d_{20}^{20}\ 0.8497,\ N_D^{20}\ 1.45172$$

This is a new composition of matter.

EXAMPLE 4

*Isobutyraldehyde plus n-valeraldehyde*

Fourteen-hundred forty grams of isobutyraldehyde and 860 g. of n-valeraldehyde were mixed and fed to the discharge side of a circulatory pump which was cycling a 2% solution of sodium hydroxide at 93–96° C. The aldehyde mixture was fed in over a 2-hour period and the unreacted aldehydes distilling from the reactor were condensed and recycled to the reactor. The reactor was overflowed continuously and the organic layer decanted and steam distilled from 2% caustic. Unreacted aldehydes were stripped off and the crude enal product was dried and distilled on a 100-plate column at 16-to-1 reflux. An 87% conversion to 2-propyl-4-methylpentenal $$[(CH_3)_2CHCH{=}C(C_3H_7)CHO]$$

was obtained and the yield based on isobutyraldehyde was 92%. 2-propyl-4-methylpentenal distills at 178–179° C., $$d_{20}^{20}\ 0.8437,\ N_D^{20}\ 1.44567$$

This is a new composition of matter.

EXAMPLE 5

*Isobutyraldehyde plus 3-methyl butyraldehyde*

Fourteen-hundred forty grams of isobutyraldehyde and 860 g. of 3-methylbutyraldehyde were mixed and fed to the suction side of a circulatory pump which was cycling a 2% solution of sodium hydroxide heated to 92–95° C. The aldehyde mixture was fed in over a three-hour period and unreacted aldehydes which distilled from the reactor were condensed and recycled to the reactor. The total reaction time was 3 hours. The reactor was continuously overflowed, the organic layer was separated and the water layer was returned to the reactor system. The organic layer was distilled from a 2% caustic solution and the steam distillate was stripped of unreacted aldehydes. The crude enal product was dried and distilled on a 100-plate column at 16-to-1 reflux. A 67% conversion to 2-isopropyl-4-methylpentenal was obtained and the yield based on isobutyraldehyde was 87%. 2-isopropyl-4-methylpentenal $$[(CH_3)_2CHCH{=}C(isopropyl)CHO]$$

distills at 175° C. This is a new composition of matter. The conversion of 3-methylbutyraldehyde to 2-isopropyl-5-methylhexenal was 28%. 2-isopropyl-5-methylhexenal distills at 190° C.

EXAMPLE 6

*Mixed valeraldehydes from butenes 1 and 2*

By oxonation of a 97% butene fraction containing 48% butene-1 and 49% butene-2 there was obtained a 2.6-to-1 mixture of n-valeraldehyde and isovaleraldehyde (2-methylbutyraldehyde). This aldehyde mixture was fed directly to the discharge side of a circulatory pump which was cycling a 5% solution of sodium hydroxide at 92–96° C. The unreacted aldehydes distilling from the reaction mixture were condensed and recycled to the reactor. A portion of the reactor liquid was overflowed continuously, the organic layer decanted and fed to a column where it was distilled from 2% caustic. The water layer from the reactor decanter was returned to the reactor. The total reaction time was 4 hours. Distillation of the product gave a 52% yield to 2-propyl-4-methylhexenal, boiling point 200° C., and a 39% yield to 2-propylheptenal $$[CH_3CH_2CH_2CH_2CH{=}C(C_3H_7)CHO]$$

boiling point 208–209° C.

EXAMPLE 7

*Mixed valeraldehydes from butenes and isobutene*

A refinery butane-butene stream was treated to separate the butene stream containing 37% isobutylene, 26% butene-1 and 34% butene-2. This material was oxonated with a 1-to-1 mixture of carbon monoxide and hydrogen at 130–145° C. and 2500–3000 p. s. i. Five-thousand grams of the aldehyde mixture as obtained from the continuous oxo reactor contained 1635 grams of 3-methylbutyraldehyde, 2110 grams of n-valeraldehyde and 1255 grams of 2-methylbutyraldehyde. This mixture was fed to the suction side of a circulatory pump which was cycling a 5% solution of sodium hydroxide at 92–95° C. The organic-to-water ratio in the reactor was maintained at 70–30 and the total liquid volume in the reactor was 1400 ml. The unreacted 5-carbon aldehydes which distilled out of the reactor were condensed and recycled to the suction side of the pump. A portion of the reactor liquid was continuously overflowed to a decanter and the water layer returned to the reactor. The organic layer was fed to a steam distillation column and steam distilled from 2% caustic solution. After stripping off unreacted valeraldehydes the crude enal product was dried and distilled on a 100-plate column at 16-to-1 reflux. The conversion of valeraldehydes to 10-carbon enals was 91% and the total yield was 4296 grams. The enal fraction contained 1396 grams of 2-propyl-4-methylhexenal, 770 g. of 2-isopropyl-4-methylhexenal, 991 g. of 2-isopropyl-5-methylhexenal and 1137 g. of 2-propylheptenal. The boiling range of the enal fraction was 192–208° C.

EXAMPLE 8

*2-methyl butyraldehyde plus propionaldehyde*

Seventeen-hundred twenty grams of 2-methylbutyraldehyde and 580 g. of propionaldehyde were mixed and fed to the suction side of a pump which was cycling a 2% solution of potassium hydroxide at 94° C. The aldehyde mixture was fed in over a period of 70 minutes. The excess 2-methylbutyraldehyde distilling out of the reactor was condensed and recycled to the reactor. A 91% conversion of propionaldehyde to 2,4-dimethylhexenal $[CH_3CH_2CH(CH_3)CH{=}C(CH_3)CHO]$, B. P. $_{760}$172° C., $$d_{20}^{20}\ 0.8490,\ N_D^{20}\ 1.45144$$

was obtained. This is a new composition of matter.

EXAMPLE 9

*2-methyl valeraldehyde + n-hexaldehyde*

The oxonation of pentene-1 gave a 1.6/1 mixture of normal and isohexaldehyde. The iso and normal hexaldehydes were reacted as in Example 8 to give a 62% yield of 2-butyl-4-methylheptenal and 29% yield of 2-butyloctenal.

*2-alkyl-4-methylpentanals and 2-alkyl-4-methylhexanals*

All of the enals prepared in the above examples were hydrogenated to form the corresponding anals by carrying out the hydrogenation in the presence of Raney nickel at 60–70° C. and at moderately elevated pressures in the range 50 to 1500 p. s. i. The anals produced according to the process of this invention include 2,4-dimethylhexanal, 2-ethyl-4-methylhexanal, 2-isopropyl-4-methylhexanal, 2-propyl-4-methylhexanal, 2-propyl-4-methylpentanal, 2-propyl-4-methylpentanal, 2-isopropyl-4-methylpentanal and 2-ethyl-4-methylpentanal. These conversions are illustrated in the following examples.

EXAMPLE 10

In a typical run 500 g. of 2-propyl-4-methylpentenal was charged to a rocking autoclave with 25 grams of Raney nickel and 50 ml. of water. The autoclave was purged with hydrogen and heated to 60° C. at 300 p. s. i. When approximately 125% of the theoretical hydrogen had been used the reaction was stopped and the autoclave discharged. The crude anal product was filtered, washed with water, dried and distilled. A 78% conversion to 2-propyl-4-methylpentanal

[(CH$_3$)$_2$CHCH$_2$CH(C$_3$H$_7$)CHO]

boiling point 170° C. was obtained. This is a new composition of matter.

EXAMPLE 11

Operating in the same manner as reported in Example 8, the following results were obtained: 2-ethyl-4-methylpentenal was converted 86% to 2-ethyl-4-methylpentanal, boiling point 153° C. 2-isopropyl-4-methylpentenal gave an 81% conversion to 2-isopropyl-4-methylpentanal, boiling point 166° C. 2-ethyl-4-methylhexenal gave a 78% conversion to 2-ethyl-4-methylhexanal, boiling point 178° C. 2-isopropyl-4-methylhexenal gave an 89% conversion to 2-isopropyl-4-methylhexanal, boiling point 183° C. 2-propyl-4-methylhexenal gave a 91° conversion to 2-propyl-4-methylhexanal, boiling point 192° C. 2,4-dimethylhexenal gave a 72% conversion to 2,4-dimethylhexanal, boiling point 162° C. All of these anals are new compositions of matter. They are important intermediates in the preparation of saturated aliphatic acids useful in plasticizers, detergents, and as solubilizing agents for metal oxides used in paint driers and oil bodying.

EXAMPLE 11a

Seven hundred fifty grams of 2-ethyl-4-methylpentanal was charged to an oxidation column 5' high and 1" I. D. Air was admitted through a dispersion plate at the bottom of the column and the anal was oxidized at 30–40° C., cooling as required to maintain this temperature. The oxidation found to have occurred at the end of 4 hours as indicated by the percent oxygen in the exit air, was greater than 18 percent.

Distillation was carried out on a 30-plate bubble cap column and after removing unchanged anal, 576 grams of 2-ethyl-4-methylpentanoic acid was obtained. 2-ethyl-4-methylpentanoic acid is a clear, colorless liquid, boiling point 218–220° C. at 760 mm.

EXAMPLE 11b

The cobalt and lead salts of 2-ethyl-4-methylpentanoic acid were formed by fusing a suspension of the metal oxide in the organic acid and driving off water. The cobalt and lead salts were 7 and 9 percent more soluble respectively in toluene than the corresponding 2-ethylhexoate salts.

EXAMPLE 11c

A three-liter, three-necked flask was fitted with a stirrer and water trap. The flask was charged with 3 moles (438 g.) of 2,2,4-trimethyl-1,3-pentanediol, 6.5 moles of 2-ethyl-4-methylpentanoic acid, 2 ml. of sulfuric acid and 500 ml. of benzene. The theoretical quantity of water was azeotroped out. The mixture was cooled, washed with 5% sodium hydroxide, washed with water and stripped under vacuum.

The di-2-ethylhexyl ester of the diol was prepared in the same manner. The mechanical properties of Geon 101 (a polyvinyl chloride polymer—B. F. Goodrich Co.) at plasticizer concentrations of 40 P. H. R. (parts per hundred of rubber) are shown below.

|  | 2,2,4-trimethyl-1,3-pentane di-2-ethyl-4-methylpentanoate | 2,2,4-trimethyl-1,3-pentane di-2-ethylhexoate |
|---|---|---|
| Tensile, p. s. i. | 3,000 | 2,850 |
| Percent Elongation | 420 | 380 |
| Tear Resistance | 480 | 410 |
| Soapy H$_2$O | 3.2 | 3.8 |
| Activated Carbon | 1.4 | 1.8 |
| Modulus, 35,000 | −48 | −42 |

As low temperature lubricants and di-2-ethyl-4-methylpentanoate has a pour point of −75° C. compared with −60° C. for the di-2-ethylhexoate.

2-alkyl-4-methylpentanols and 2-alkyl-4-methylhexanols

The isoenals produced by the condensation of the isoaldehydes (isobutyraldehyde and 2-methylbutyraldehyde) with 3, 4 and 5-carbon aldehydes are reduced in the presence of a suitable hydrogenation catalyst and at elevated temperatures and pressures to form the corresponding anols. These alcohols are particularly useful in the preparation of plasticizers, detergents and synthetic lubricants. For example, di-2-propyl-4-methylhexylphthalate is an excellent plasticizer for vinyl chloride and vinyl acetate resins. Similarly di-2-ethyl-4-methylpentylsebacate has excellent properties as a synthetic lubricant. It is also useful as a plasticizer for cellulose acetate-butyrate plastics. The 2-alkyl-4-methylpentanols and 2-alkyl-4-methylhexanols are formed by reducing the corresponding isoenals in the presence of a catalyst such as Raney nickel at temperatures ranging from 100 to 200° C. and at elevated pressures in the range of 100–10,000 p. s. i.

These new compositions of matter were prepared by the process illustrated in the following examples.

EXAMPLE 12

Five-hundred grams of 2-propyl-4-methylpentenal, 30 g. of Raney nickel and 50 ml. of water were charged to a stainless steel rocking autoclave. The autoclave was purged with hydrogen and heated to 150° C. at 300 p. s. i. The reduction was complete in 2 hours and a 97% yield of 2-propyl-4-methylpentanol, boiling point 192–192.5° C. was obtained. The percent hydroxyl (calculated) 11.80, found 11.81, $d_{20}^{20}$ 0.82702, $N_D^{20}$ 1.43120

M$_D$ from density and refractive index, calculated 45.12, theory 45.31.

EXAMPLE 13

Five-hundred grams of 2-propyl-4-methylhexenal, 50 g. of Raney nickel and 50 ml. of water were charged to a rocking autoclave. The hydrogenation was carried out at 160° C. and 3000 p. s. i. and the reaction was complete in 1.5 hours. The autoclave was discharged, the product filtered, washed with water, dried and distilled to give a 97% yield of 2-propyl-4-methylhexanol, boiling point 208–209° C. Other properties of this new alcohol were $d_{20}^{20}$ 0.83002, $N_D^{20}$ 1.43561 molecular refractivity, calculated 49.821, theory 49.93, percent hydroxyl, found 10.8, theory 10.75.

EXAMPLE 14

In a similar manner 2-isopropyl-4-methylpentenal was hydrogenated in 99% yield to form 2-isopropyl-4-methylpentanol, boiling point 187° C. 2-ethyl-4-methylhexenal was hydrogenated in 93% yield to form 2-ethyl-4-methylhexanol, boiling point 195° C., $d_{20}^{20}$ 0.8303, $N_D^{20}$ 1.43313

M$_D$ calculated 45.16, theory 45.31. 2-isopropyl-4-methylhexenal was hydrogenated in 93% yield to form 2-isopropyl-4-methylhexanol, B. P. 201–202° C. 2,4-dimethylhexenal was hydrogenated in 95% yield to 2,4-dimethylhexanol, boiling point 177° C.

All of the above alcohols are new compositions of matter and are excellent plasticizer and synthetic lubricant intermediates.

The new compositions of matter described above and their boiling points are summarized in Table I.

TABLE I

| Isoaldehyde+Aldehyde | | | Boiling Points of Condensation Products at 760 mm. | | |
|---|---|---|---|---|---|
| | | | Enals, degrees centigrade | Anals, degrees centigrade | Anols, degrees centigrade |
| isobutyraldehyde | n-butyraldehyde | 2-ethyl-4-methylpentenal | 164 | 153 | 176.5 |
| | n-valeraldehyde | 2-propyl-4-methylpentenal | 178-9 | 170 | 192 |
| | 3-methylbutyraldehyde | 2-isopropyl-4-methylpentenal | 175 | 166 | 187 |
| 2-methylbutyraldehyde | propionaldehyde | 2,4-dimethylhexenal | 172 | 162 | 177 |
| | n-butyraldehyde | 2-ethyl-4-methylhexenal | 187 | 178 | 195 |
| | 3-methylbutyraldehyde | 2-isopropyl-4-methylhexenal | 192 | 183 | 202 |
| 2-methylvaleraldehyde | n-valeraldehyde | 2-propyl-4-methylhexenal | 200 | 192 | 209 |
| | n-hexanal | 2-butyl-4-methylheptenal | 224 | 215 | 232 |

*Dicarboxylic acid esters of 2-alkyl-4-methylpentanols and 2-alkyl-4-methylhexanols*

2-Ethyl-4-methylpentanol, 2-propyl-4-methylpentanol, 2-isopropyl-4-methylpentanol, 2,4-dimethylhexanol, 2-ethyl-4-methylhexanol, 2-propyl-4-methylhexanol, 2-isopropyl-4-methylhexanol and combinations thereof were reacted with succinic, glutaric, alipic, azelaic, sebacic, and phthalic acids to form the corresponding diesters. These diesters have particularly valuable plasticizer properties which include improved compatability, they are stable to oxidation and have greater permanence than previously known esters.

EXAMPLE 15

Four-hundred grams of 2-propyl-4-methylhexanol, 148 grams of phthalic anhydride and 0.05 ml. of $H_2SO_4$ were heated to reflux in a round bottom flask equipped with a Dean-Stark trap. The theoretical quantity of water, 18 ml., was removed rapidly and after distilling off the excess alcohol the remaining di-2-propyl-4-methylhexyl phthalate ester had an APHA color of 15. This ester is an excellent plasticizer for vinyl chloride and cellulose ester resins. Its boiling point is 173–176° C. at 0.15 mm.

EXAMPLE 16

Two-hundred twenty-five grams of 2,4-dimethylhexanol were mixed with 111 gm. phthalic anhydride and 0.1 ml. $H_2SO_4$. The mixture was heated at reflux until the theoretical amount of water had been collected in the water trap. The excess alcohol was removed by distillation to leave a faintly colored ester. The di-2,4-dimethylhexyl phthalate boils at 190–194° C. at 1.5 mm.

EXAMPLE 17

Two-hundred twenty-five grams of 2,4-dimethylhexanol were mixed with 50 grams succinic anhydride and 0.1 gm. p-toluenesulfonic acid in a flask equipped with a condenser and water trap. The mixture was refluxed until the theoretical amount of water was formed, the excess alcohol removed by distillation. The straw colored ester was distilled at reduced pressure to yield colorless product B. P.$_{1.5}$ 151–155° C.

EXAMPLE 18

One-hundred forty-eight grams of phthalic anhydride, 320 grams of 2-propyl-4-methylpentanol and 0.2 gm. $H_2SO_4$ were mixed and heated at reflux until the theoretical amount of water had been obtained. The excess alcohol was removed by distillation at reduced pressure and the ester distilled to yield a very light colored product B. P.$_{1.5}$ 203–207° C.

EXAMPLE 19

One-hundred forty-six grams of adipic acid, 350 grams of 2-propyl-4-methylpentanol, and 0.05 ml. $H_2SO_4$ were mixed in a flask equipped with a condenser and water trap. This mixture was heated at reflux until 36 ml. of water had been collected. The excess alcohol was removed at reduced pressure to leave di-2-propyl-4-methylpentyl adipate which had an APHA color of 20. The boiling point of this ester is 193–197° C. at 1.2 mm.

EXAMPLE 20

One-hundred eighty-eight grams of azelaic acid, 350 gm. 2-isopropyl-4-methylpentanol, and 0.05 ml. $H_2SO_4$ were mixed and heated at reflux until the theoretical amount of water had been collected. The excess alcohol was removed by distillation to leave a lightly tinted ester B. P.$_{1.0}$ 210–213° C.

EXAMPLE 21

Three-hundred fifty grams of 2-isopropyl-4-methylpentanol and 202 gm. sebacic acid were treated with 0.05 gm. $H_2SO_4$ at reflux temperature until the theoretical amount of water had been collected. The excess alcohol was removed and the di(-2-isopropyl-4-methyl-)pentyl sebacate distilled at reduced pressure to yield a slightly colored product B. P.$_{1.5}$ 217–220° C.

EXAMPLE 22

One-hundred seventy-five grams of 2-ethyl-4-methylhexanol, 714 grams phthalic anhydride and 0.1 ml. $H_2SO_4$ were refluxed in a flask equipped with a Dean-Stark tube until the theoretical amount of water was obtained. The excess alcohol was removed by distillation and the ester was distilled at reduced presure to give di-(2-ethyl-4-methyl)hexyl phthalate B. P.$_{0.5}$ 202–206° C.

EXAMPLE 23

Two-hundred grams of 2-propyl-4-methylhexanol, 74 grams phthalic anhydride and 0.1 gm. $H_2SO_4$ were mixed and heated at reflux until the theoretical amount of water was formed. Distillation at reduced pressure after removal of the excess alcohol gave di(2-propyl-4-methylhexyl)phthalate B. P.$_{1.0}$ 218–221° C.

EXAMPLE 24

Two-hundred grams of 2-propyl-4-methylhexanol, 50 grams of succinic anhydride and 0.1 gm. $H_2SO_4$ were mixed and heated at reflux until the theoretical amount of water had been collected in the water trap. The excess alcohol was removed and the residue distilled at reduced pressure to yield a water white ester di(2-propyl-4-methylhexyl)succinate B. P.$_{1.5}$ 175–178° C.

The diesters of the present invention when used as plasticizers with vinyl resins and cellulose esters, such as cellulose acetate butyrate, also give higher values for tensile strength, per cent elongation and tear resistance. Comparative values for the phthalate esters of 2-ethyl-4-methylpentanol, 2-propyl-4-methylhexanol and other commercially available 8 and 10 carbon alcohols are shown in Tables II and III. The 8 carbon 2-ethyl-4-methylpentanol is compared with the well-known commercial 2-ethylhexanol. The 10 carbon 2-propyl-4-methylhexanol is compared with isodecanol produced by the oxonation of nonylene (propylene trimer).

TABLE II.—50 P. H. R. IN GEON 101

Phthalate esters of 8 and 10 carbon alcohols

| Reference | 2-propyl-4-methyl- | | 2-ethyl-4-methyl- | |
|---|---|---|---|---|
| | hexanol | isodecanol | pentanol | 2-ethylhexanol |
| Tensile Strength | 2,800 | 2,500 | 3,450 | 3,300 |
| Elongation | 380 | 270 | 370 | 330 |
| Tear Resistance | 420 | 320 | 460 | 330 |
| Percent Loss Act. Carbon | 0.4 | 0.6 | 1.3 | 1.4 |

TABLE III.—40 P. H. R. IN GEON 101

| Reference | 2-propyl-4-methyl- | | 2-ethyl-4-methyl- | |
|---|---|---|---|---|
| | hexanol | isodecanol | pentanol | 2-ethylhexanol |
| Tensile Strength | 3,250 | 3,050 | 3,850 | 3,400 |
| Elongation | 400 | 370 | 310 | 290 |
| Tear Resistance | 610 | 530 | 560 | 400 |
| Percent Loss Act. Carbon | 0.2 | 0.4 | 1.1 | 1.1 |

The above results show that the 2-alkyl-4-methylpentanols and the 2-alkyl-4-methylhexanols have a definite superiority over previously available commercial plasticizer alcohols. Properties are listed in Table IV for several other diesters and plasticizer alcohols produced according to the process of the present invention.

TABLE IV.—50 P. H. R. IN GEON 101

Properties of plasticized vinyl

| Reference | bis-2-ethyl-4-methyl-pentyl adipate | bis-2-propyl-4-methyl-pentyl phthalate | bis-2-ethyl-4-methyl-hexyl phthalate |
|---|---|---|---|
| Tensile Strength (p. s. i.) | 2,900 | 2,800 | 2,900 |
| Elongation (percent) | 390 | 380 | 410 |
| Tear Resistance | 310 | 420 | 440 |
| Percent Loss Act. Carbon | 1.5 | 0.6 | 0.4 |

We claim:

1. A process for forming enals by the reaction of an isoaldehyde having 4–6 carbon atoms with a lower aliphatic aldehyde containing from 2–6 carbon atoms, which comprises reacting an excess of the isoaldehyde with the lower aliphatic aldehyde in the presence of a strongly alkaline catalyst and at temperatures ranging from 60–150° C.

2. A process for forming 2-alkyl-4-methylpentenals which comprises reacting an excess of isobutyraldehyde with a 2–6 carbon lower aliphatic aldehyde in the presence of a strongly alkaline catalyst at 60–150° C.

3. A process for forming 2-alkyl-4-methylhexenals which comprises reacting isovaleraldehydes with lower aliphatic aldehydes containing from 2–6 carbon atoms in the presence of a strongly alkaline catalyst at 60–150° C.

4. A process for reacting 2-methylvaleraldehyde and lower aliphatic aldehydes to form enals which comprises reacting excess isohexaldehyde with the lower aliphatic aldehyde containing from 2–6 carbon atoms in the presence of a strongly alkaline catalyst at 60–150° C.

5. The process according to claim 2 wherein n-butyraldehyde is the lower aliphatic aldehyde and the enal produced is 2-ethyl-4-methyl pentenal.

6. The process according to claim 2 wherein n-valeraldehyde is the lower aliphatic aldehyde and the enal produced is 2-propyl-4-methylpentenal.

7. The process according to claim 3 wherein propionaldehyde is the lower aliphatic aldehyde and the enal produced is 2,4-dimethylhexenal.

8. The process according to claim 3 wherein n-butyraldehyde is the lower aliphatic aldehyde and the enal produced is 2-ethyl-4-methyl hexenal.

References Cited in the file of this patent

UNITED STATES PATENTS

| 2,015,077 | Lawson | Sept. 24, 1953 |
| 2,549,457 | Gresham | Apr. 17, 1951 |

OTHER REFERENCES

Kohn: Monatshefte für Chemie, 22, pp. 21–58 (1901).
Beilstein: Band I, p. 707, 741 (1918).
Burdick: J. Am. Chem. Soc., 56, 438–442 (1934).